United States Patent Office 3,273,332
Patented Sept. 20, 1966

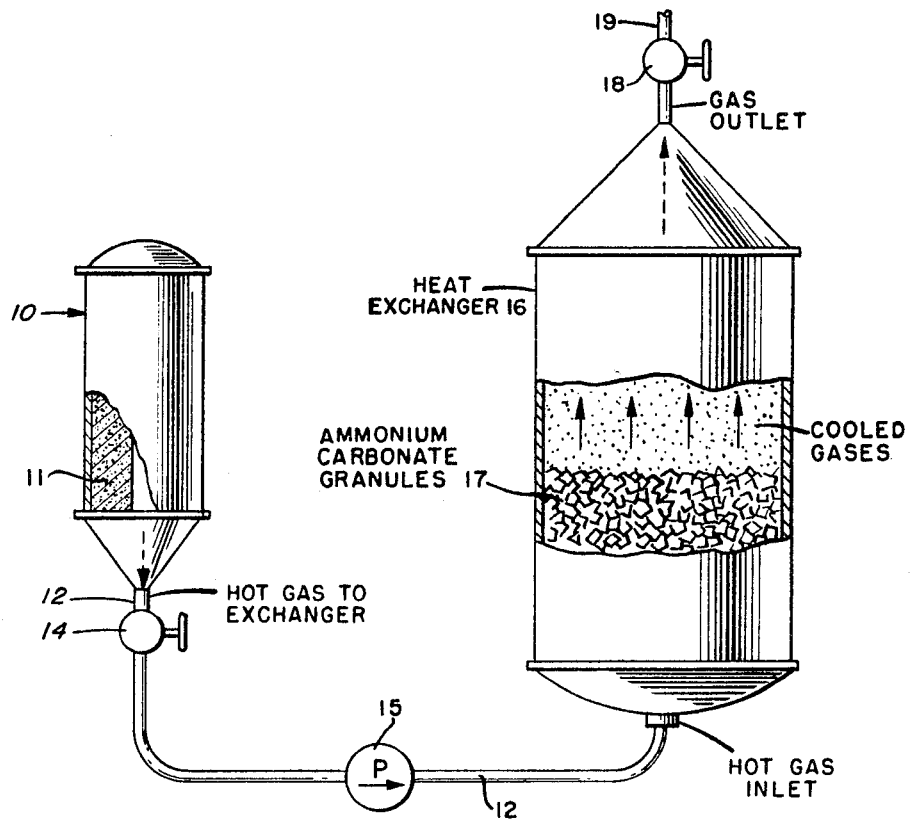

---

3,273,332
PRODUCTION OF COOLED PROPELLANT GASES THROUGH ENDOTHERMIC REACTION
George L. Poudrier, Fredericksburg, Va., assignor to the United States of America as represented by the Secretary of the Navy
Filed Sept. 3, 1963, Ser. No. 306,395
2 Claims. (Cl. 60—35.4)

This invention relates to a gas generator, and more particularly to an improved method and apparatus for producing relatively cool gases.

More specifically, the invention provides a method of cooling gases by directly contacting a hot gas with granules of a decomposable material so as to concurrently cool and produce excess gas for useful work such, for example, as inflating bladders or bags commonly used in survival equipment and other inflatable devices.

Heretofore, such methods employed expensive and elaborate equipment consisting of a heat exchanger using tubes, fins, and cooling coils. In this type of prior art apparatus the hot gases are disposed on one side of the container wall while the absorbing medium or heat absorbing material is on the other side of the wall. The heat transfer area is thus defined by the walls of the container. Direct cooling utilizing ice particles in contact with the material to be cooled is often resorted to as a temperature control procedure. In many reactions, however, direct cooling by means of ice cannot be employed owing to the diluting action of water formed by melting of the ice. Furthermore, direct cooling by the addition of ice to some reaction mixtures may result in the combination of the free water with one or more of the ingredients present in the mixture to form a hydrate, thereby altering the equilibrium conditions of the reaction mixture. In some cases the use of ice may even result in an undesired change of the state of the system, such as precipitation of a salt, or the like. Thus in such cases it has been necessary to resort to indirect instead of direct cooling.

It has also been the practice to cool the reaction mixture by means of coils immersed in the reaction mixture and through which cold water or brine is circulated. This method of cooling, however, is inefficient in reactions of the character in which a precipitate is formed during the course of the reaction and settles out, or in reactions in which the reaction mixture is in the form of a slurry, inasmuch as the solids contained in the mass tend to deposit upon the walls of the cooling coil and interfere with the transfer of heat. Internal cooling coils in such cases also cause difficulty in the removal of the reaction mixture or solid product from the vessel. In addition, internal brine cooling coils are subject to corrosion by the reaction mixture and frequently develop leaks, causing the introduction of brine as an impurity into the reaction mixture, which is generally not discovered until the batch has been spoiled. Moreover, external cooling of the reaction mixture, either by means of a coil or jacket through which cooling water or brine is circulated, has also been extensively employed, although such cooling is highly inefficient.

Furthermore, in many processes heretofore used, there is a sudden evolution of heat at a certain stage of the reaction which cannot be efficiently controlled by these indirect cooling means. Also, many reactions are preferably carried out at temperatures below the range readily obtainable by brine cooling and it has heretofore been necessary to resort to elaborate and expensive refrigerating equipment in order to cool them adequately.

An object of the present invention is to provide a new and improved method and apparatus of cooling gases.

Another object of the invention is to provide a method and apparatus for directly contacting a hot gas with granules of a decomposable material so as to concurrently cool and produce excess gas.

Still another object of the invention is to provide an apparatus wherein hot gas is directed on and through a quantity of heat absorbing material thereby to generate more gas.

A still further object of the invention is to provide a method and apparatus of cooling gases so that they may be utilized to do useful work such, for example, as inflating bladders or the like or to generate an artificial atmosphere.

Other objects, advantages and novel features of the invention will become apparent from the following detailed description of the invention when considered in conjunction with the accompanying drawing wherein:

The drawing is a diagrammatic illustration of the system using a propellant grain as a combustible product and ammonium carbonate as a specific example of a product which decomposes during an endothermic reaction at a temperature of approximately 58° C.

The combustion chamber or burner 10 is filled with a propellant grain 11 which is ignited in the usual manner through suitable electrical apparatus (not shown) and during combustion produces hot gases which are conducted from the burner by the tube 12. A valve 14 and a pump 15 in the tube line 12 may be used to control the rate of burning.

The hot gases are delivered to a tank or heat exchanger 16 which is partly filled with granules 17 of a material which will decompose during an endothermic reaction and at a comparatively low temperature. Such a material should produce gases which are not condensable under normal conditions, that is, at approximately 20° C. and normal pressure. The material illustrated is ammonium carbonate which decomposes into ammonia and carbon dioxide, neither of which will condense under normal conditions.

The hot gases passing through the granules of ammonium carbonate decompose the ammonium carbonate and add to the volume of the gas while extracting heat from the products of combustion of the propellant grain. The cooled gas leaves the heat exchanger through the valve 18 and pipe 19 to be delivered where desired.

Assuming, for example, that the gas law holds; we have $$PV = NRT$$

Where P is the pressure, V is the volume, N is the number of mols of gas, and T is the temperature. The conventional methods lead to a reduction since it merely reduces T in the above expression in the PV product.

In the present method a solid granular material is used in direct contact with the hot gases. The heat absorbing medium is thus decomposed by the hot gases to gaseous products, it being understood that the chemical reaction requires heat which is obtained from the hot gases. Using the simple analysis as set forth above, we can indicate for the new PV product an expression:

$$PV = (N + \Delta N)RT$$

Where $\Delta N$ results from the decomposition of the heat absorbing medium. Here, while T is reduced, $\Delta N$ is being generated thus tending to keep the PV product constant or even making it larger. In addition, the use of the solid granular material in direct contact with the hot gases provides very large heat transfer areas thus substantially increasing the heat transfer efficiency over methods and apparatus heretofore used. Moreover, the gas density at the outlet end of the exchanger is considerably greater than the gas density at the inlet end and in addition thereto this gas is considerably cooler than the gas at the inlet end since the inlet or hot gas decomposes the solid particles of the heat absorbing material as it contacts and passes through the bed or quantity of granular material, whereupon a substantial amount of heat is removed from the hot gas and thus additional and much cooler gas results which gas accumulates at the outlet end of the exchanger. For example, where AN results from the decomposition of the heat absorbing medium, while here T is reduced; more gas is liberated thus tending to keep the PV product constant or even making it somewhat larger.

In practice a single base propellant may be used such, for example, as the type containing a substantial part of nitrocellulose or double base propellants such, for example, as the type containing nitrocellulose and nitroglycerin. It has been found that composite types are also usable which types contain a binder such, for example, as polyvinyl chloride or urethan or epoxyes and oxidizers such, for example, as nitrate perchlorates, etc. Moreover, if so desired, certain metals may be used such, for example, as aluminum magnesium and the like.

From the foregoing it will be understood that any suitable type of propellant compositions may be used in carrying out the invention, including solid, liquid and gaseous types.

It is to be further understood that while ammonium carbonate has been used other material may also be used, depending on the specific use and application. Such materials need not be pure chemicals. If so desired, they may be suitable types of plastics such, for example, as polystyrene, epoxyes, polyvinyl chlorides, poly carbonates, Bakelite or mixtures of plastics and pure chemicals.

In the improved method the additional heat required to chemically decompose the heat absorbing material improves such that there is an even higher quantity of heat absorbed per pound of absorbing material. In other words for a fixed quantity of heat to be absorbed the improved method would require the least number of pounds of absorbent material.

In general, the rate of heat transfer is controlled by the area across which heat flow takes place, the resistances through the flow and the temperature difference across the heat transfer area. Furthermore, the temperature of the heat absorber material, in the present method, is lower for a given quantity of heat absorbed than in the conventional exchanger, thus increasing the temperature difference which also tends to increase the rate of heat transfer.

The conventional heat exchanger merely reduces T, whereas the present method, while reducing T of the hot gas, the decomposition process which decreases T also liberated gas thereby increasing N (mols of gas), tending to hold or increase the product (multiply) NRT constant. That is as T is reduced N is increased.

In the conventional heat exchangers the quantity of gas at the outlet or outlet gas is equal to the quantity of gas at the inlet or inlet gas. In the heat exchanger of the present invention the gas at the outlet or outlet gas is the sum of the quantity of inlet gas plus the quantity of gas generated in the exchanger. Moreover, the incoming hot gas has a given composition. However, additional gases are generated in the exchanger which mix directly with the incoming hot gas. Therefore, by selecting a suitable heat absorbent material, the gas composition of the exchanger gas may be controlled and since such gas mixes with the incoming hot gas, the gases at the outlet of the exchanger, have a different chemical composition than the incoming gases.

From the foregoing it will be apparent that a new and improved method and apparatus has been devised wherein considerable saving in time and equipment is effected. Cooling of the reaction mixture by means of coils through which cold brine is circulated requires approximately 8 to 12 hours to bring the reaction mixture to the required temperature. The required cooling is effected, however, in accordance with the above procedure in considerably less time such, for example, as between 15 to 25 minutes. Furthermore, the absence of cooling coils and their attendant circulating and cooling equipment, reduces the initial and maintenance costs of the apparatus and increases its productive capacity.

Obviously many modifications and variations of the present invention are possible in the light of the above teachings. It is therefore to be understood that within the scope of the appended claims the invention may be practiced otherwise than as specifically described.

What is claimed is:

1. A method of cooling gases through an endothermic decomposable reaction, comprising:

producing a gas through the combustion of a propellant;

passing said gas through a mass of solid granules of a decomposable material, said decomposable material cooling said gas and producing additional gas through process of decomposition, which additional gas is non-condensible under normal conditions.

2. A method of cooling gases according to claim 1 wherein the decomposable material is ammonium carbonate.

References Cited by the Examiner

UNITED STATES PATENTS

| 3,067,594 | 12/1962 | Bland et al. | 62—4 |
| 3,083,527 | 4/1963 | Fox | 60—35.4 |
| 3,143,445 | 8/1964 | Hebenstreit | 149—1 |

OTHER REFERENCES

Handbook of Chemistry and Physics, 30th Edition, 1947, pp. 370–371.

BENJAMIN R. PADGETT, *Acting Primary Examiner.*

A. G. BOWEN, *Assistant Examiner.*